United States Patent
Lehureau et al.

[15] 3,689,529
[45] Sept. 5, 1972

[54] PROCESS OF MANUFACTURING CHLOROPHENYL ESTERS

[72] Inventors: Jean Lehureau, Rambert L'ile Barbe; Jase M. Moyne, Caluire, both of France

[73] Assignee: Progil, Paris 8 eme, France

[22] Filed: July 8, 1969

[21] Appl. No.: 840,041

[30] Foreign Application Priority Data

July 15, 1968 France.....................6850222

[52] U.S. Cl.................260/479 R, 260/408, 260/463, 260/468 R, 260/475 PN, 260/476 R, 260/479 S

[51] Int. Cl..............................................C07c 67/02

[58] Field of Search..........260/479 R, 476 R, 475 PN, 468 R

[56] References Cited

OTHER PUBLICATIONS

Tarbell et al., J. Org. Chem. (1959) Vol. 24, pp. 774–778.

Windholz; J. Org. Chem. (1960) Vol. 25, pp. 1703–1707.

Green Chemistry and Industry (1961) pp. 435.

*Primary Examiner*—James A. Patten
*Attorney*—Browdy and Neimark

[57] ABSTRACT

Esters of organic acids and chlorinated phenols useful as presticides are produced by reacting chlorinated phenol chloroformate with organic acid.

5 Claims, No Drawings

PROCESS OF MANUFACTURING CHLOROPHENYL ESTERS

The present invention relates to a new process of manufacturing esters of organic acids and chlorinated phenols.

It is known that chlorophenyl esters are products having interesting fungicidal, insecticidal, bactericidal and herbicidal properties.

The most usually used methods, for the fabrication of those esters, consist of reacting either a phenol alkali metal salt with the convenient acid chloride, or the free phenol with the acid chloride in the presence of an hydracid acceptor such as pyridine, or still the free phenol with an excess of acid anhydride. Those methods give generally good enough results, but they have the disadvantage of using acid chlorides and anhydrides as raw materials and these raw materials have a high price.

It has now been found that the desired esters can be prepared by a new process which is easy to carry out, which gives excellent yields, and which avoids the precited disadvantage of high priced starting materials.

The process according to the present invention generally comprises reacting at a temperature of the range from 150° to 250° C. the chlorinated phenol chloroformate with the convenient organic acid.

The chemical reaction may be illustrated schematically — in the monocarboxylic acid case — by the following equation:

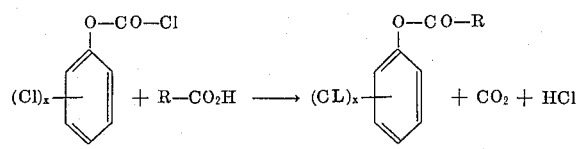

in which R is the hydrocarbon group of the acid used and $x$ the number of chlorine atoms.

The chloroformates used as raw materials are well known products, easily provided by classical methods, as for example, by phosgene reaction on an alkaline aqueous solution of chlorophenol, at a temperature of 10° to 40° C., in the presence of an organic solvent. For the application of the process according to the invention, it is possible to start from raw chloroformates — that is, such as they are recovered after aqueous phase decantation followed by distillation of the organic solvent — or from distillation-purified chloroformates. Those products may be derivatives of mono- or polychlorinated phenols, especially tri- and pentachlorophenols. They may be constituted with phosgenation products of only one chlorophenol, or of a mixture of isomer and/or differently chlorinated chlorophenols, as for example, a mixture of 2,4,5 and 2,4,6- trichlorophenols or 2,4 and 2,6-dichloro and 2,4,6 trichlorophenols.

The process according to the present invention is useful for the preparation of a large range of esters: indeed it may be applied to mono- or polycarboxylic acids in which the hydrocarbon radical may be cycloaliphatic or aromatic, as well as aliphatic. So, for example, it is possible to quote in a non limitative way, the following acids: acetic, propionic, butyric, capric, lauric, stearic, oleic, malonic, succinic, benzoic, cyclohexanecarboxylic, phthalic, etc..

As indicated above, the process according to the present invention consists of submitting reagents to temperatures which may be comprised between about 150° and 250° C. Below 150° C. ester formation is too slow; moreover, a secondary reaction takes place, giving in a relatively important quantity, the chlorophenol corresponding to the used chloroformate. Above 250° C. the appearance of several decomposition subproducts is noted. On the contrary, if the process is carried out from 150° C. or better from 170° C, esterification is quicker and the secondary reaction mentioned above is reduced to a minimum. If the upper limit of 250° C. is not exceeded, preferably 230° C., there are practically no decomposition phenomena. A practical and efficient way to proceed consists of introducing the acid little by little into the chloroformate brought to and maintained at a temperature of the range from 150° to 180° C., and then, at the end of acid addition, increasing progressively the reaction medium temperature up to about 200° to 230° C. It is not necessary to pre-heat the acid before introducing it into the chloroformate. If it is in solid state at room temperature it is possible to melt it previously or to add it in solid form to the chloroformate.

The respective ratios of reagents may correspond to stoichiometry, but it may be advantageous in some cases, as for example with the lightest acids of aliphatic series, to operate with an excess of acid, for example of the range from 3 to 20 percent in moles. However, the ratio of reagents is not critical except that reagent may be wasted and the product must be separated from the excess after the completion of the reaction.

The process is usually achieved under normal pressure, but this factor is also not critical. It is possible to add an inert organic solvent but this operative measure is not especially beneficent.

The time necessary to complete the reaction varies principally with regard to the used acid. Esterification is generally slow when the acid has a greater number of carbon atoms in the molecule. On the whole, reaction times range approximately from 2 to 5 hours, taking into account the time necessary for acid addition. Reaction development is easily followed because of hydrogen chloride and carbon dioxide evolution. This gaseous mixture may, besides, according to industrial needs, be separated in its constituents, for example by HCl absorption in water.

The desired ester represents the main fraction of the reaction mass, but it is generally contaminated with some chlorophenol and, moreover, it may contain a small quantity of free acid, when an excess thereof is used. To obtain a pure ester it is possible, in most cases, to achieve an alkaline washing according to the classical methods. For this, the cooled reaction product is dissolved in a usual organic solvent, such as aliphatic or aromatic, possibly chlorinated hydrocarbon, as carbon tetrachloride, benzene, toluene, mono-chlorobenzene; then the mass is washed with an alkaline lye, preferably a 5–10 percent by weight NaOH aqueous solution. After decantation and water washing of the organic phase, solvent is removed by distillation.

The esters obtained according to the present invention have a sufficient purity when prepared from pure chloroformates. When the starting material used is a raw chloroformate it is preferred to purify the resultant ester by distillation under a reduced pressure.

The yields obtained owing to the process according to the invention are very good since they generally exceed 90 percent with regard to starting chloroformate.

The examples hereinafter, given in a non-limitative way, show how the process may be applied.

EXAMPLE 1

In a flask surmounted by a cooler and provided with a stirring device, 1,185 g. (3.6 moles) of pentachlorophenyl chloroformate were placed. This product was obtained, according to classical technics, by introducing gaseous phosgene in an alkaline aqueous solution of pentachlorophenol, added with carbon tetrachloride, at a temperature of 15°–20° C., then separating by decantation, followed by water washing of the organic phase containing chloroformate, again separating by decantation, solvent distilling and chloroformate distilling. The chloroformate was heated to about 170° C. and 293 g. (3.96 moles) or propionic acid was added over about one hour while maintaining the temperature at 170° C. From the beginning of this addition, the appearance of substantial gaseous evolution was noted. When the whole of acid had been added, the temperature was permitted to rise progressively up to the end of the gaseous evolution, which required about 1 ½ hours. Then the mixture was at 215°–220° C.

After reaction medium cooling, 2,000 ml of carbon tetrachloride were added. The mixture was then washed with a 5 percent NaOH aqueous solution and then with water, decanting and removal of the aqueous phase following each washing. After solvent distillation under reduced pressure, 1,047 g. of pentachlorophenyl propionate were obtained, which represented a yield of 90 percent with regard to chloroformate.

The above procedure was repeated, but this time raw chloroformate was used, that is chloroformate not previously distilled (weight 1,252 g.). After esterification, alkaline washing and solvent distillation, followed by distillation at 180° C. under 15 mm Hg., 1,047 g. of pure pentachlorophenyl propionate were obtained. A distillation residue of 67 g. constituted mainly with bis (pentachlorophenyl) carbonate remained.

EXAMPLE 2

Example 1 was repeated with the same operative conditions but in starting this time from raw 2,4,6-trichlorophenyl chloroformate.

There was obtained, with a yield fairly similar to the one of example 1, pure 2,4,6-trichlorophenyl propionate distilling at 147° C. under 15 mm. Hg.

EXAMPLE 3

In 1,040 g. (4 moles) of 2,4,6-trichlorophenyl chloroformate (pure) heated at 170° C. there was added, in 2 hours, 800 g. (4 moles) of lauric acid — in solid form. Then, during a new period of 2 hours, temperature rose progressively up to 230° C.

The reaction medium was cooled and dissolved in 3,500 ml of carbon tetrachloride. First this phase was washed with a 10 percent sodium hydroxide aqueous solution, then with water, followed each time by decanting and removal of the aqueous phase. Then the solvent was distilled under low vacuum. There was obtained 1,410 g. of 2,4,6-trichlorophenyl laurate, which represents a yield of about 93 percent with regard to chloroformate.

EXAMPLE 4

Raw pentachlorophenyl chloroformate was reacted with lauric acid, in introducing the acid in molten state into chloroformate. Operative conditions were the same as in the previous example. After alkaline washing, as indicated in example 3, the obtained product was distilled. Pentachlorophenyl laurate distilled at 210° C. under 2 mm Hg.

EXAMPLE 5

There was prepared and treated by alkaline washing, 2,4,6-trichlorophenyl stearate — from raw trichlorophenyl chloroformate — under the same conditions as in example 3. At operation end, the mixture was distilled, the stearate distilling at 230° C. under 2mm. Hg.

EXAMPLE 6

In 1,315 g. (4 moles) of pure pentachlorophenyl chloroformate heated to 180°–185° C., 236 g. (2 moles) of solid succinic acid was added in 1 hour. The mixture was strongly stirred during all the time of the addition in order to provide superior reagent contact. The temperature progressively rose from 185° to 200° C. in 2 hours after completion of acid addition.

When gaseous evolution wholly ended, the non-reacted acid was distilled under vacuum producing 1,215 g. of raw pentachlorophenyl succinate.

The foregoing description of the specific embodiment will so fully reveal the general nature of the invention that others can, by applying current knowledge, readily modify such specific embodiment and/or adapt it for various applications without departing from the generic concept, and, therefore, such adaptations and modifications should and are intended to be comprehended within the meaning and range of equivalents.

What is claimed is:

1. A process of manufacturing chlorophenyl esters comprising reacting chlorinated phenol chloroformate with an organic acid at 150° to 250° C. said organic acid being a hydrocarbon mono- or dicarboxylic acid.

2. Process according to claim 1 wherein the chloroformate is derived from a mono- or polychlorinated phenol.

3. Process according to claim 1 wherein the organic acid is propionic acid.

4. Process according to claim 1 wherein the quantity of acid used corresponds to a molar excess of 3 to 20 percent with regard to stoichiometry.

5. Process according to claim 1 wherein the obtained ester is submitted to an alkaline washing.

* * * * *

UNITED STATES PATENT OFFICE
CERTIFICATE OF CORRECTION

Patent No. 3,689,529   Dated September 5, 1972

Inventor(s) Jean Lehureau et al.

It is certified that error appears in the above-identified patent and that said Letters Patent are hereby corrected as shown below:

In the title page, correct the spelling of the first name of the second inventor from "Jase" to --Jose--

Signed and sealed this 30th day of January 1973.

(SEAL)
Attest:

EDWARD M. FLETCHER, JR.
Attesting Officer

ROBERT GOTTSCHALK
Commissioner of Patents